United States Patent [19]

Undhjem et al.

[11] 4,035,587

[45] July 12, 1977

[54] WIRE TERMINATION BLOCK SWITCHING ARRANGEMENT

[76] Inventors: Brent Hawkley Undhjem, 2210 E. 3300 South, Salt Lake City, Utah 84109; Lorin Mark Graehl, 7146 S. 2155 East, Salt Lake City, Utah 84121; Andy James Bavelas, 1719 N. Main, Centerville, Utah 84014

[21] Appl. No.: 634,501

[22] Filed: Nov. 24, 1975

[51] Int. Cl.² .................................... H04Q 1/02
[52] U.S. Cl. .................................... 179/98
[58] Field of Search ............ 179/98, 91, 96 FG, 27, 179/271 FH, 1 SW; 200/16, 1 A, 1 R, 50 R, 51, 5 R; 339/17

[56] References Cited

U.S. PATENT DOCUMENTS

| | | | |
|---|---|---|---|
| 2,858,372 | 10/1958 | Kaufman | 179/98 |
| 2,939,937 | 6/1960 | Rejdin et al. | 200/1 A |
| 3,312,927 | 4/1967 | Garrett | 179/98 |
| 3,548,361 | 12/1970 | Garrett et al. | 179/98 |
| 3,611,268 | 10/1971 | Webb | 179/98 |
| 3,700,824 | 10/1972 | De Luca | 179/98 |
| 3,832,498 | 8/1974 | Lawson | 179/98 |

*Primary Examiner*—Kathleen H. Claffy
*Assistant Examiner*—Gerald L. Brigance
*Attorney, Agent, or Firm*—Criddle, Thorpe & Western

[57] ABSTRACT

A system for use in a telephone switching office for coupling telephone connector switches either to line group switches or to call intercept apparatus. The system includes a plurality of number terminal blocks and group terminal blocks, each of which have groups of terminal posts. Certain terminal posts of each group of the number terminal blocks are coupled to connector switches and certain other terminal posts are coupled to the call intercept apparatus. Certain of the terminal posts of each group of the group terminal blocks are coupled to line group switches. Also included is a plurality of switching tools, each of which is mounted on a different group of terminal posts of the number terminal blocks and each of which includes a first and second group of terminal posts. Included in each switching tool is apparatus for coupling certain of the number terminal block terminal posts on which the tool is mounted to certain of the switching tool terminal posts of the first group and apparatus for alternatively connecting certain other of the number terminal block terminal posts either to certain other switching tool terminal posts of the first group or to the second group terminal posts. The terminal posts of each switching tool are arranged so that an intercept tool may be mounted thereon in the same manner that such intercept tools are mounted on the terminal posts of number terminal blocks.

5 Claims, 3 Drawing Figures

U.S. Patent   July 12, 1977   4,035,587
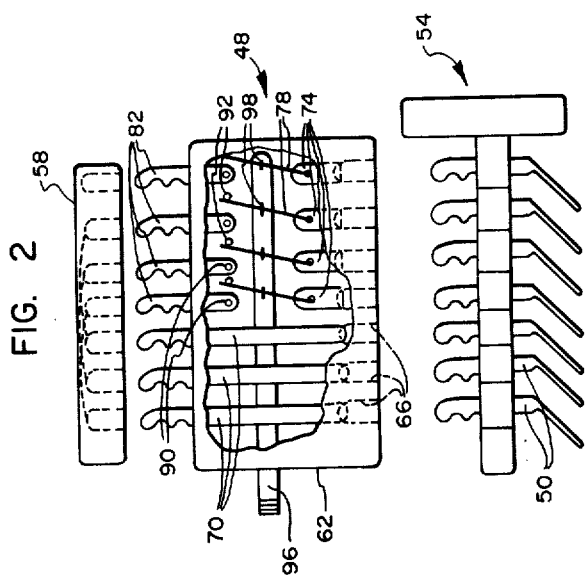
FIG. 2
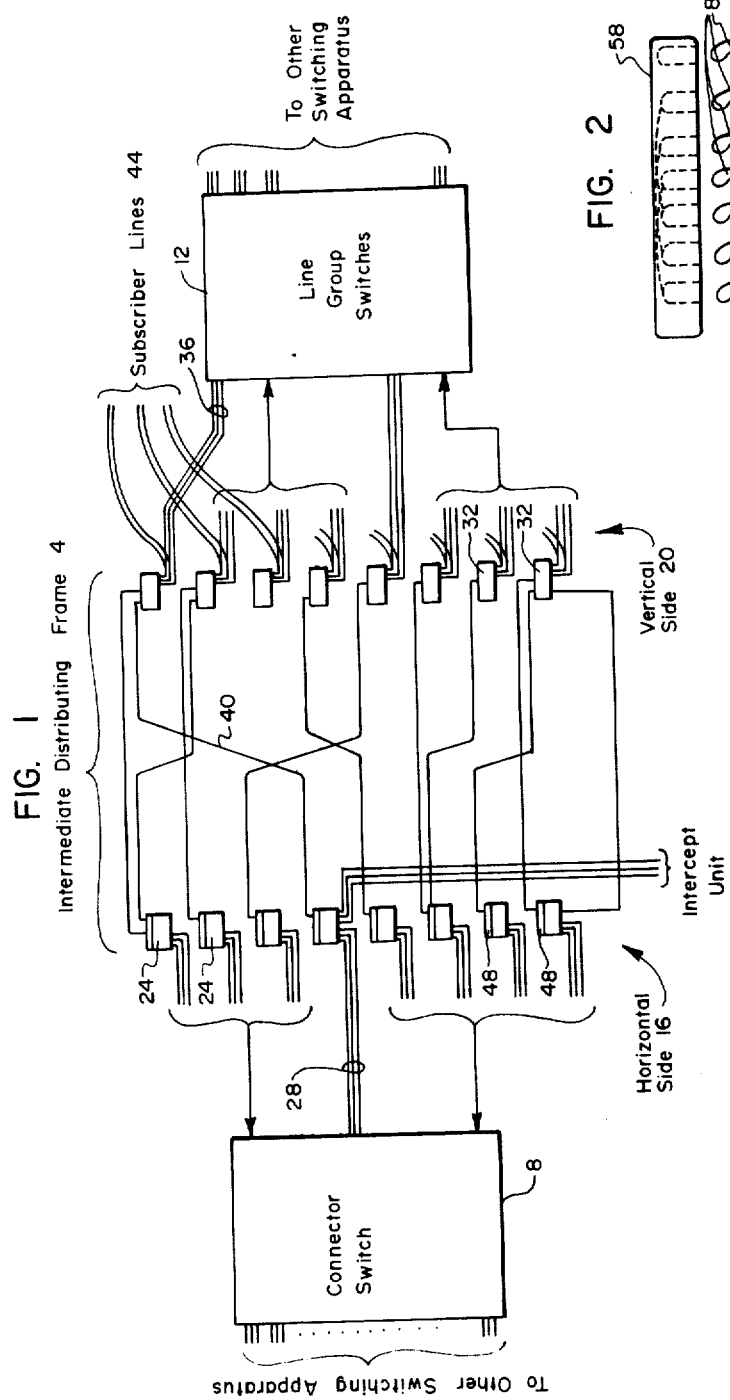
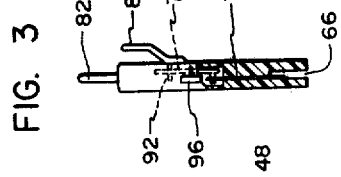
FIG. 3

WIRE TERMINATION BLOCK SWITCHING ARRANGEMENT

BACKGROUND OF THE INVENTION

This invention relates to a telephone office intermediate distributing frame arrangement and more particularly to a switching tool adapted for use on number terminal blocks of intermediate distributing frames.

In a present day telephone switching office, such as a step-by-step office, so-called intermediate distributing frames are utilized to couple subscriber input lines to input leads of live group switches and to output leads of connector switches. The output leads of the connector switches are dedicated or identified with particular subscriber numbers and the input lines of the line group switches are coupled to particular subscriber lines served by the telephone office in question. That is, when a subscriber calls a particular subscriber or telephone number of a telephone office, the calling party is switched by the line group switches to other switching apparatus and ultimately to a particular output line of a connector switch identified with the called number. This output line is coupled to an input line of the line group switches and also to a subscriber line. Of course, the particular called party reached will depend upon which subscriber line is coupled via the intermediate distributing frame to the connector switch output line in question.

Each intermediate distributing frame includes a so-called horizontal side comprised of a plurality of number terminal blocks, and a vertical side comprising a plurality of group terminal blocks. The number terminal blocks and group terminal blocks are typically of similar construction and include groups of connector or terminal posts. There are typically seven terminal posts per group in the number terminal blocks and six terminal posts per group in the group terminal blocks. Three of the terminal posts in each group of the number terminal blocks are coupled to the tip, ring and sleeve of a connector switch output line and three other terminal posts in the group are coupled to intercept apparatus. The seventh terminal post of a group in each number terminal block is for use with apparatus adapted for counting the number of calls, i.e., measured service. Three terminal posts of a group in the group terminal blocks are coupled to the tip, ring and sleeve of an input line of a line group switch and two of the three are also coupled to the tip and ring of a subscriber line. The other three terminal posts of a group are utilized when two-party lines are provided.

As already indicated, when a subscriber is assigned a number, the input line of the line group switches to which the subscriber is connected is coupled by a jumper cable to the output line of the connector switches corresponding to the assigned number. This is accomplished by wire wrapping or soldering one end of a jumper cable to the three terminal posts of the number terminal block to which the connector switch output line is coupled and by wire wrapping or soldering the other end of the jumper cable to the three terminal posts of the group terminal block to which the designated line group switch input line is coupled. The leads from the connector switches are generally coupled to the lower end of the terminal posts of the number terminal blocks and the input leads of the line group switches are similarly coupled to the lower ends of the terminal posts of the group terminal blocks. The intercept apparatus is also coupled to the lower ends of the appropriate terminal posts of the number terminal blocks. The jumper cables are wire wrapped or soldered to the upper ends of the terminal posts.

At the present time, if a subscriber line is to be disconnected, the corresponding jumper cable is removed from the terminal posts of the number terminal block and an intercept tool is placed on the number terminal block to couple the connector switch output line in question to intercept apparatus. The jumper cable is also disconnected from the group terminal block and the jumper cable then repaired or "recycled" for future use. To reconnect or place into service a subscriber line, the intercept tool is removed from the corresponding number terminal block and a new jumper cable is wire wrapped or soldered to the appropriate terminal posts of the number terminal block and a group terminal block. The problems with the present procedure described above for disconnecting and reconnecting subscriber lines is that the jumper cables must be repaired after each disconnection thereof, the number terminal blocks and group terminal blocks must be cleaned from time to time due, for example, to solder droppings, and much time is consumed in installing and removing jumper cables.

SUMMARY OF THE INVENTION

It is an object of the present invention to provide a novel telephone switching office system for connecting connector switch output leads to line group switch input leads.

It is also an object of the present invention to provide a new and different intermediate distributing frame arrangement wherein jumper cables used with such frames may be permanently wired.

It is still another object of the present invention to provide a novel switching tool adapted for installation of number terminal blocks of an intermediate distributing frame to enable permanent wiring of jumper cables to the number terminal blocks.

The above and other objects of the invention are realized in an illustrative arrangement of an intermediate distributing frame which has a plurality of number terminal blocks, a plurality of group terminal blocks, and a plurality of switching tools, each mounted on a different group of terminal posts of the number terminal blocks. Each switching tool also includes first and second groups of terminal posts, structure for electrically coupling certain ones of the first group of terminal posts to certain of the terminal posts of the number terminal block on which the switching tool is mounted, and manually operable switching structure for selectively coupling certain other terminal posts of the number terminal block either to other terminal posts of the first group of the switching tool or to the second group of terminal posts of the switching tool. Jumper cables may be coupled permanently to the second group of terminal posts of the switching tools and to appropriate terminal posts of the group terminal blocks. The first group of terminal posts of each switching tool is adapted to receive an intercept tool which may be permanently mounted thereon so that manual operation of the switching tool's switching structure allows for coupling a connector switch output line either to intercept apparatus or to the jumper cable which ultimately then couples the connector switch output line to a line group switch input line. Because of the manually operated switching structure of the switching tools, the jumper cables may be permanently wired in the intermediate distributing frame thereby saving both time and material when subscriber lines are connected or disconnected.

BRIEF DESCRIPTION OF THE DRAWINGS

The above and other objects, features and advantages of the present invention will become apparent from a consideration of the following detailed description presented in connection with the accompanying drawings in which:

FIG. 1 shows a generalized schematic diagram of an intermediate distributing frame of a telephone switching office;

FIG. 2 shows a side, partially cut away view of a switching tool made in accordance with the present invention and adapted for use with terminal blocks of an intermediate distributing frame; and FIG. 3 shows an end, partially cross-sectional view of the switching tool of FIG. 2.

DETAILED DESCRIPTION

Referring to FIG. 1, there is shown a generalized schematic diagram of an intermediate distributing frame 4 intercoupling connector switches represented by the block 8 and line group switches represented by the block 12. The connector switches and line group switches are composed of sets of the well-known step-by-step switch. The connector switches 8 are also coupled to other switching apparatus of a telephone office (not shown) as are the line group switches.

The intermediate distributing frame 4 includes a horizontal side 16 which is connected to the connector switches 8, and a vertical side 20 which is connected to the line group switches 12 and to subscriber lines 44. The horizontal side of the intermediate distributing frame 4 is composed of a plurality of number terminal blocks 24, each of which inlcudes a plurality of rows or groups of terminal posts such as the posts 50 of the number terminal block 54 shown in FIG. 2. Seven terminal posts are included in each group or row of the number terminal blocks. The lower ends of three of such terminal posts are coupled to an output line (tip, ring and sleeve), such as output line 28, of the connector switches 8, which line corresponds to a particular telephone number of the local switching office in which the equipment of FIG. 1 is located. The lower ends of three other terminal posts of each group are connected to an intercept unit (not shown in FIG. 1) such as automatic intercept apparatus or operator controlled intercept equipment. The final terminal post of each group is coupled to call measuring equipment if measured service happens to be provided in the local switching office in question.

The vertical side 20 of the intermediate distributing frame 4 is composed of a plurality of group terminal blocks 32 which typically are similar to the number terminal blocks except each row or group of terminal posts includes only six such posts rather than seven. The lower ends of three posts in each group of a group terminal block are coupled to an input line (tip, ring and sleeve), such as input line 36, of the line group switches 12. Two of such terminal posts are also coupled to a subscriber line (tip and ring) so that the input line of the line group switches is coupled to the subscriber line in question. If the local switching office in question provides two party service, then the other three terminal posts of each group are utilized.

In present day intermediate distributing frames, in order to connect an output line, such as line 28, of the connector switches 8 to an input line, such as line 36, of the line group switches 12, one end of a jumper cable 40 would be wire wrapped or soldered to the upper ends of the terminal posts of the number terminal block to which the line 28 was connected, and the other end of the jumper cable 40 would be similarly wire wrapped or soldered to the upper ends of the terminal posts of the group terminal block to which the line 36 was connected. In this manner, a particular subscriber line connected to a line group switch input line would be connected to the connector switch output line corresponding to the particular telephone number assigned to the subscriber line.

To briefly explain the establishment of a call through the equipment shown in FIG. 1, assume that a subscriber on one of the subscriber lines 44 (coupled through a main frame not shown) picks up his telephone receiver and thereby goes off hook. When this occurs, a line group switch (line finder) hunts over its input lines to locate the input which is connected to the originating subscriber line. When such input line is found, the hunting line group switch couples the line to a next switching stage of the local office (not shown) and dial tone is returned to the originating subscriber. The originating subscriber then dials the called number and this actuates the local office switching stages to successively connect the originating subscriber line ultimately to one of the output lines of the connector switches 8. This assumes that the called party is also a subscriber at the local office rather than a subscriber of another local office. Connecting the originating subscriber line to one of the output lines of the output lines of the connector switches effectively completes the connection to the called subscriber line with the only remaining action to be taken being that of applying ringing current to the called line.

If a subscriber line is disconnected, as earlier indicated, the appropriate jumper cable is removed from the group terminal block and number terminal block in question and a so-called intercept tool is placed over the upper ends of the terminal posts of the number terminal block row or group in question. An intercept tool 58 is diagrammatically shown in FIG. 2. As there indicated, the intercept tool serves to electrically couple together three different pairs of terminal posts on which the intercept tool is mounted. In particular, the intercept tool serves to couple the three terminal posts to which the disconnected output line, such as line 28, is coupled to the three terminal posts of that same group which are coupled to the intercept unit. In this manner, the disconnected one of the output lines of the connector switches 8 is coupled via the intercept tool to the intercept unit so that calls placed to that disconnected line are intercepted by appropriate intercept apparatus. (Two types of intercept tools are used, one for automatic intercept apparatus and one for operator controlled intercept apparatus.)

If a disconnected line is subsequently reconnected, then the intercept tool must be removed and a jumper cable again installed to connect the corresponding output line of the connector switches 8 to the input line of the line group switches 12.

In accordance with the present invention, a plurality of switching tools 48 (FIG. 1) are provided for use in conjunction with the number terminal blocks 24. As best seen in FIG. 2, each switching tool 48 is adapted for placement or mounting on a row or group of terminal posts 50 of a number terminal block 54. Each switching tool 48 includes a housing 62 for containing the component parts of the tool. Formed in the bottom of the housing are a plurality of recesses or receptacles 66 for receiving a group or row of terminal posts 50 of a number terminal block 54. Three terminal posts 70 are disposed in the housing to extend from within three of the recesses 66 upwardly and out the top of the housing 62 as generally shown in FIG. 2. The lower ends of the terminal posts 70 are disposed in corresponding recesses 66 so that when the switch tool 48 is placed over a group of terminal posts of a number terminal block, the terminal posts of the number terminal block are received into the three recesses in question to contact and engage the terminal posts 70.

Also disposed in the housing 62 are four contact elements 74, each of which is disposed to extend partially within a different one of the recesses 66 to thereby contact and engage a corresponding terminal post of a number terminal block on which the switching tool 48 is mounted. Conductor strips 78 are pivotally mounted on and electrically coupled to the contact elements 74 to enable pivoting of the strips 78 between a first position, in which the strips are in engagement with corresponding ones of four terminal posts 82 which extend out the top of the housing 62 to form a row with the upper ends of the three terminal posts 70, and a second position, in which the conductor strips 78 engage corresponding ones of four other terminal posts 86 (FIG. 3) which extend from within the housing 62 out the back wall thereof. Specifically, the conductor strips 78 may be pivoted between one set of contact fingers 90 which are electrically joined to and extend from corresponding terminal posts 82 and another set of contact fingers 92 which are electrically coupled to and extend from corresponding terminal posts 86. (FIG. 2 shows the conductor strips 78 in engagement with the contact fingers 92 of the terminal posts 86.)

A slider bar 96 extends from within the housing out one end thereof so that it may be grasped by a system user and slid longitudinally within the housing 62. The slider 96 is insulatingly coupled by staples 98 or other fastening means to the conductor strips 78 so that when the bar 96 is slid longitudinally, the conductor strips 78 are caused to pivot between the first and second positions described above.

FIG. 3 shows a partially cross-sectional, end view of the switching tool 48 of FIG. 2. A contact element 74 is there shown extending partially into a recess 66 to facilitate engagement with a corresponding terminal post of a number terminal block on which the switching tool may be mounted. A conductor strip 78 is shown pivotally mounted to the contact element 74 to extend upwardly where it may engage contact finger 92 of the terminal post 86. The slider bar 96 is also shown in FIG. 3.

With the switching tool 48 shown in FIGS. 2 and 3, and four contact elements 74 each may be alternatively coupled to a corresponding terminal post 82 or to a corresponding terminal post 86. Installation of the switching tools on the number terminal blocks of an intermediate distributing frame 4 allows permanent wiring of the jumper cables to the number terminal blocks 24 of the intermediate distributing frame 4. In particular, the switching tools are mounted on the groups of terminal posts of each number terminal block, with both the output lines of the connector switches 8 and the leads to the intercept unit being coupled to the number terminal blocks as previously described. The jumper cables are then wired or soldered to the corresponding group terminal blocks 32 just as is presently done and to the terminal posts 86 of the switching tools. When a subscriber line is connected to the local switching office, the corresponding switching tool is placed in a condition so that the conductor strips 78 are in engagement with the terminal posts 86. Thus, a subscriber line, such as line 28 from the connector switches 8 is coupled through a number terminal block to the terminal posts 86 of the switching element and from there via a jumper cable to the corresponding group terminal block and finally to a line group switch input line and to a subscriber line.

If it is desired to disconnect the subscriber line, the slider bar 96 of the switching element is moved so that the conductor stips 78 contact terminal posts 82 thus disconnecting the switching tool from the jumper cable. An intercept tool 58 is then placed over the terminal posts 70 and 82 of the switching element so that terminal posts 70 are coupled to those terminal posts 82 which are coupled to the intercept unit. In this manner, the output line in question from the connector switches 8, corresponding to the disconnected subscriber line, is coupled via the switching tool to intercept apparatus, and the jumper cable remains wired to the swithcing tool. When the subscriber line is again placed in service, the switching tool in question may then be manually operated to reconnect the line. The intercept tool 58 may either be removed or left on the switching element.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements. For example, rather than providing terminal posts 70 and 82 which extend out the top of the housing 62 of the switching tool 48, such posts could be electrically coupled together internally of the housing to effect the same result as is obtained when an intercept tool is mounted on the switching tool of FIG. 2. Then of course, no intercept tools would be needed for the switching tools.

What is claimed is:

1. In a telephone switching office, a system for coupling telephone connector switch output leads either to subscriber lines or to call intercept apparatus, the switching office including a plurality of number terminal blocks, each including a plurality of groups of terminal posts, the lower ends of certain posts of a group being connected to certain connector switch output leads identified with particular subscriber numbers and the lower ends of certain other posts of a group being connected to the call intercept apparatus, and a plurality of group terminal blocks, each including a plurality of groups terminal posts, the lower ends of some of such posts of a group being connected to subscriber lines, the improvement comprising a plurality of switching tools, each including
a housing having a plurality of recesses therein for receiving the upper ends of a group of number terminal block terminal posts to enable mounting the switching tool on the posts, a first group of terminal posts extending from the housing to enable mounting an intercept tool thereon, a second group of terminal posts extending from the housing, means for electrically coupling certain terminal posts of a number terminal block on which the switching tool is mounted to certain of the switching tool terminal posts of the first group, and means for alternatively coupling certain other terminal posts of a number terminal block on which the switching tool is mounted either to certain other switching tool terminal posts of the first group or to the switching tool terminal posts of the second group, and means for coupling selected ones of the second group terminal posts of the switching tools to the upper ends of selected ones of the terminal posts of the group terminal blocks.

2. A system as in claim 1 wherein said alternative coupling means comprises a ganged switch manually operable to either a first position in which said certain other terminal posts of a number terminal block are coupled to said certain other switching tool terminal posts of the first group, or to a second postion in which said certain other terminal posts of a number terminal block are coupled to said switching tool terminal posts of the second group.

3. In a telephone office intermediate distributing frame arrangement including a plurality of number terminal blocks, each including groups of wire terminal posts, certain posts of each group being coupled to connector switches and certain other posts of each group being coupled to telephone intercept apparatus, and a plurality of group terminal blocks, each including groups of wire terminal posts, certain posts of each group being coupled to a subscriber line, the improvement comprising a plurality of switching tools, each mounted on a different group of terminal posts of the number terminal blocks and each including a group of terminal posts, a plurality of contact elements, each of which engages a different one of the terminal posts of the number terminal block on which the switching tool is mounted, and manually operable switching means for selectively coupling certain of the contact elements of the switching tool either to the remaining contact elements of the switching tool or to the switching tool terminal posts, and means for electrically coupling the switching tool terminal posts to the terminal posts of the group terminal blocks.

4. A switching tool adapted for use on telephone office intermediate distributing frame terminal blocks comprising a housing having a plurality of receptacles therein for receiving terminal posts of a terminal block on which the switching tool is mounted, contact elements carried in the housing adjacent the receptacles for contacting terminal posts inserted into the receptacles, a first group of terminal posts extending from the housing on which an intercept tool may be mounted, a second group of terminal posts extending from the housing and spaced apart from the first group of terminal posts, means coupling certain of the contact elements to certain ones of the terminal posts of the first group, and manually operable switching means for alternatively coupling certain other of the contact elements either to certain other of the terminal posts of the first group or to the second group of terminal posts.

5. A switching tool in claim 4 wherein said switching means comprises a coupling means mounted in engagement with said certain other contact elements and movable into engagement with either said certain other terminal posts of the first group or said second group of terminal posts.

* * * * *